United States Patent [19]

Nagashima et al.

[11] Patent Number: 4,542,387

[45] Date of Patent: Sep. 17, 1985

[54] THERMAL TRANSFER TYPE PRINTING APPARATUS

[75] Inventors: Masayoshi Nagashima, Chigasaki; Hiroshi Yamane, Ebina; Makoto Nonoyama, Yokohama; Tsuneo Tashiro, Sagamihara, all of Japan

[73] Assignee: Toshiba Corporation, Kawasaki, Japan

[21] Appl. No.: 467,165

[22] Filed: Feb. 16, 1983

[30] Foreign Application Priority Data

Feb. 17, 1982 [JP] Japan .................................. 57-24121
Feb. 17, 1982 [JP] Japan .................................. 57-24123

[51] Int. Cl.⁴ .......................... G01D 15/10; B41J 3/20
[52] U.S. Cl. ................................ 346/76 PH; 400/120
[58] Field of Search .................... 346/76 PH; 400/120

[56] References Cited

U.S. PATENT DOCUMENTS 4,250,511 2/1981 Stein at al. ...................... 346/76 PH
4,447,818 5/1984 Kurata et al. .................. 400/120 X

*Primary Examiner*—George H. Miller, Jr.
*Attorney, Agent, or Firm*—Cushman, Darby & Cushman

[57] ABSTRACT

A thermal transfer type printing apparatus includes a monochromatic printing section and multi-color printing section. The monochromatic printing section includes a thermal head unit for thermally transferring an ink layer of a black ink ribbon onto a paper sheet according to a black image signal. The multi-color printing section includes a thermal head unit for successively transferring cyan, magenta and yellow layers of a multi-color ink ribbon in an overlap state onto the paper sheet according to image signals for the respective colors.

5 Claims, 13 Drawing Figures

THERMAL TRANSFER TYPE PRINTING APPARATUS

BACKGROUND OF THE INVENTION

This invention relates to a color printing apparatus and, more particularly, to a thermal transfer type printing apparatus using a thermal head.

Color printing apparatuses usually are provided for business purposes and are large in scale. Recently thermal transfer types have become available. A thermal transfer type color printing apparatus is small in size, requires no substantial maintenance and has high reliability. For these reasons, they are used for various apparatuses such as color electrographic apparatuses. In the prior art thermal transfer type color printing apparatus, however, different printing operations for four different colors, i.e., black, cyan, magenta and yellow, must always be done successively in a single printing section. Therefore, unnecessary printing operations are performed for monochromatic prints. This not only means that the printing speed is reduced but also the efficiency of ink ribbon use is also reduced since unused portions of the ink ribbon are discharged.

Further, monochromatic printing inevitably requires increased resolution, that is, a thermal head having a large number of bits must be used. Therefore, when a thermal head for color printing is driven, signal processing involving a number of bits must be done a number of times. This complicates the circuitry and increases the cost of the thermal head.

SUMMARY OF THE INVENTION

An object of the invention is to provide a thermal transfer type printing apparatus with a simple construction and a simple signal processing, which can produce high quality printed matter.

According to the invention, there is provided a thermal transfer type color printing apparatus, which comprises first printing means for effecting printing according to image signals for colors other than black and second printing means for effecting printing according to a black image signal, and in which the first and second printing means can be driven independently to obtain a monochromatic or color print.

DETAILED DESCRIPTION OF THE PREFERRED EMBODIMENTS

Figure 1:
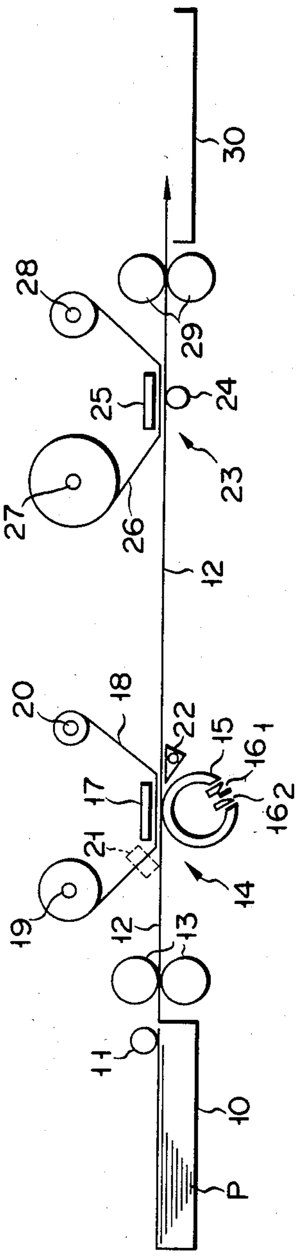
FIG. 1 is a schematic view showing an embodiment of the thermal transfer type printing apparatus according to the invention.

FIG. 1 shows an embodiment of the color printing apparatus. The apparatus is used with a paper feed cassette 10 accommodating, for instance, A4 size paper sheets. The paper sheets P can be fed out one-by-one by a paper feed roller 11 between a pair of press rollers 13 and 13. The press rollers 13 and 13 are made of metal or rigid plastic and make each paper sheet flat and smooth to transfer uniformly the ink of an ink ribbon 18 to the paper sheet. The paper sheet forced out through the press rollers 13 and 13 is fed along a transport path 12 into a color printing section 14. The color printing section 14 includes a winding drum 15 provided with clippers $16_1$ and $16_2$. These clippers $16_1$ and $16_2$ serve to clip the leading and trailing edges of the paper sheet P respectively. The clippers $16_1$ and $16_2$ project from the winding drum 15. When the leading edge of the paper sheet P strikes the clipper $16_1$, this edge is held in position by a plurality of pawls of the clipper $16_1$. The paper sheet P is subsequently wound on the winding drum 15 with the rotation thereof. When the trailing edge of the paper sheet P strikes the clipper $16_2$, this edge is held in position by a plurality of pawls of the clipper $16_2$. The circumferential dimension of the winding drum 15 is greater than the length of the paper sheet P.

A thermal head unit 17 is disposed to face the winding drum 15. A color ink ribbon 18 extends between the thermal head unit 17 and the paper sheet P wound on the winding drum 15. The ink ribbon 18 is paid off from an ink ribbon feed reel 19 and taken up on an ink ribbon take-up reel 20. A color detector 21 is disposed on the path of the ribbon from the ink ribbon feed reel 19 to the thermal head unit 17. A paper separating nail 22 is provided to separate the paper sheet P from the winding drum 15.

A black-and-white printing section 23 is disposed subsequent to the color printing section 14. The section 23 includes a press roller 24 and a thermal head unit 25. The press roller 24 and thermal head unit 25 face each other on the opposite sides of the paper sheet transport path 12. A black ink ribbon 26 travels between the paper sheet transport path 12 and thermal head unit 25. When paper sheet P is brought into the black-and-white printing section 23, the ink ribbon 26 is brought into close contact with the paper sheet passing by the press roller 24. The black ink ribbon 26 is fed from an ink ribbon feed reel 27 to the printing section 23 and is taken up by an ink ribbon take-up reel 28.

Paper discharge rollers 29 are disposed on the outlet side of the black-and-white printing section 23. These rollers 29 serve to discharge print paper P into a tray 30.

Figure 2:
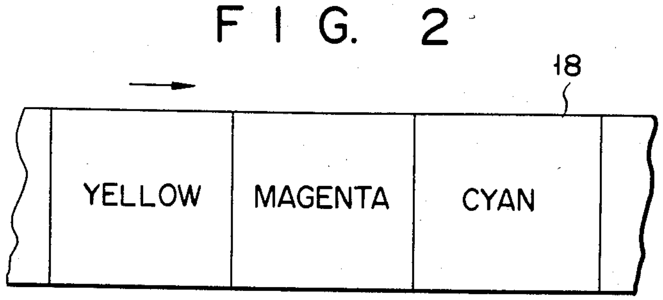
FIG. 2 is a plan view showing a color ink ribbon used with the printing apparatus of FIG. 1.
Figure 3:
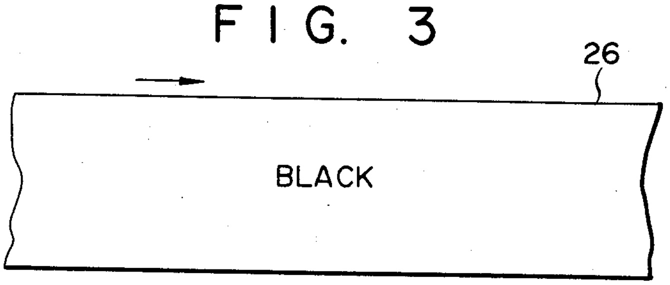
FIG. 3 is a plan view showing a black ink ribbon used with the printing apparatus of FIG. 1.

The color ink ribbon 18 in the color printing section 14 has a structure as shown in FIG. 2. As is shown, the ink ribbon 18 has color ink layers for cyan, magenta and yellow formed on a condenser paper several microns thick and each having a size corresponding to the size of the paper sheet. The color ink layers are sequentially and closely arranged in the mentioned order in the paper feeding direction. These color ink layers are composed of wax, dies, resins, etc. The black ink ribbon 26 in the black-and-white printing section 23, as shown in FIG. 3, is formed of a black ink material such as a wax, die, a resin, etc. which is coated on the entire surface of a condenser paper several microns thick. The black ink ribbon 26 is provided for a greater number of prints than that covered by the color ink ribbon 18.

Figure 4:
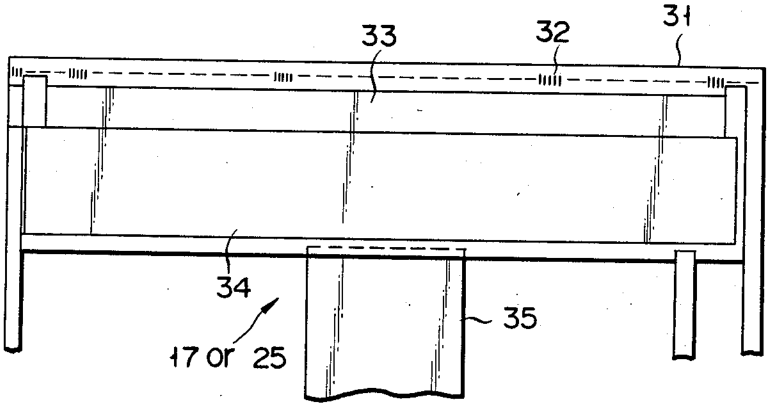
FIG. 4 is a plan view showing a thermal head unit.
Figure 5:
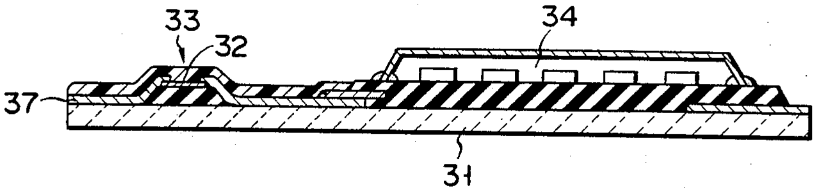
FIG. 5 is a sectional view showing the thermal head unit of FIG. 4.

FIGS. 4 and 5 show the thermal head units 17 and 25. As shown, the units each include a ceramic base 31, a thermal head 33 fabricated by a row of linear heating elements 32 formed on the base 31 and a driver 34 for driving the thermal head 33. An input section of the driver 34 is connected to a lead line 35.

Figure 6:
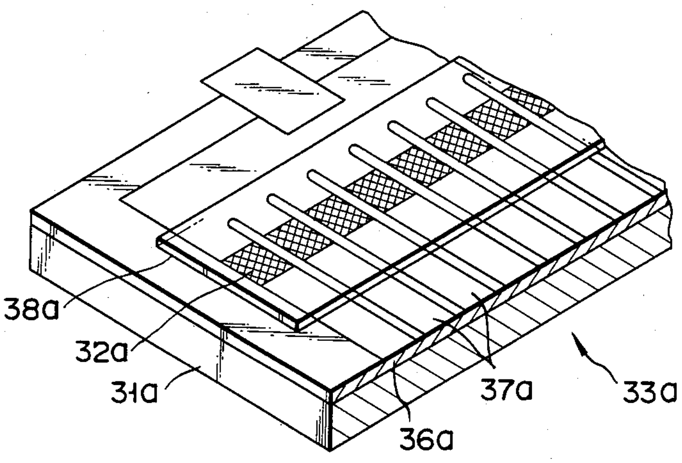
FIG. 6 is a fragmentary perspective view showing a thermal head for color printing.
Figure 7:
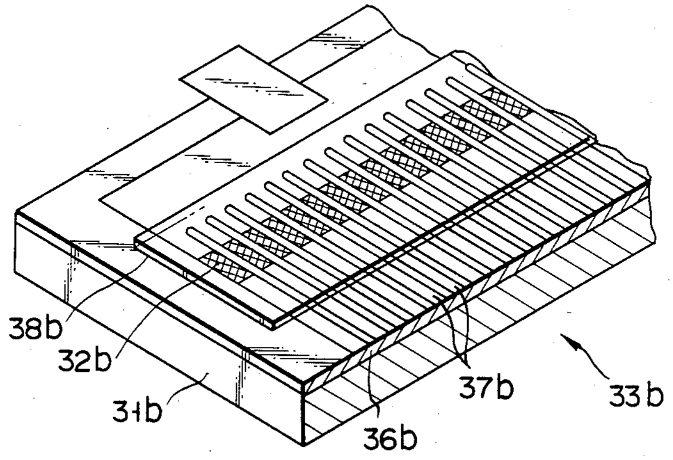
FIG. 7 is a fragmentary perspective view showing a thermal head for black-and-white printing.

The thermal head units 17 and 25 respectively have thermal heads 33*a* and 33*b* having heating elements arranged at different densities as shown in FIGS. 6 and 7. The thermal head 33*a*, which is a color thermal head, has heating element layers 32*a* and electrode layers 37*a*, these layers being formed on a graze layer 36*a* which is in turn formed on the ceramic base 31*a*. The heating element layers 32*a* are formed for 1,728 dots with a density of 8 layers/mm. A protective film 38*a* is formed to partly cover the heating element layers 32*a* and electrode layers 37*a*. The thermal head 33*b* basically has the same construction as the color thermal head 33*a* except that the heating element layers 32*b* of this head are formed for 3,456 dots with a density of 16 layers/mm.

Figure 8:
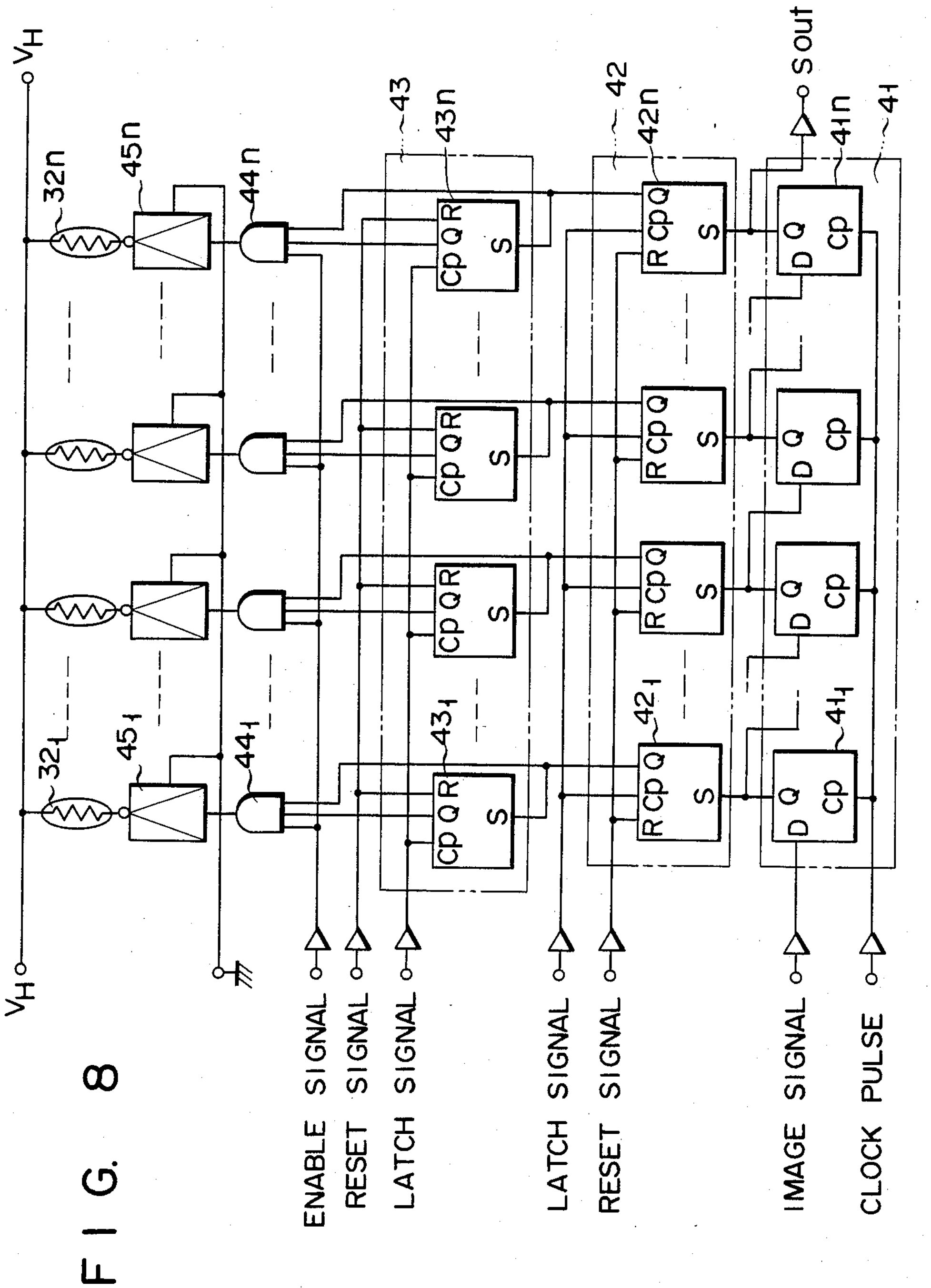
FIG. 8 is a circuit diagram showing the electric circuit of the thermal head unit.

The drivers of the thermal head units 17 and 25 basically have the same construction except that the number of dots for the latter unit is double the number of dots in the former unit. FIG. 8 shows the circuit construction of the driver 17 or 25. The circuit includes a 1,728-bit or 3,456-bit shift register 41 and latch circuits 42 and 43 having the same bit number as the shift register 41. The shift register 41 includes D type flip-flops $41_1$ to $41_n$ (n being 1,728 or 3,456). An image signal input terminal is connected through an inverter to the terminal D of the first-stage flip-flop $41_1$. The terminal D of each of the following stage flip-flops $41_2$ to $41_n$ is connected to the output terminal Q of the immediately preceding stage flip-flop. A clock pulse input terminal is connected through an inverter to the terminal CP of each flip-flop. The output terminals of the flip-flops $41_1$ to $41_n$ are connected to the set terminals S of the corresponding flip-flops $42_1$ to $42_n$ in the latch circuit 42. A reset signal input terminal and a clock input terminal are connected through an inverter to the reset and clock terminals R and CP of the flip-flops $42_1$ to $42_n$. The output terminals of the flip-flops $42_1$ to $42_n$ are connected to the set terminals S of the corresponding flip-flops $43_1$ to $43_n$ in the latch circuit 43 and the first input terminals of corresponding AND gates $44_1$ to $44_n$. A latch signal input terminal is connected through an inverter to the clock terminals CP of the flip-flops $43_1$ to $43_n$. When the circuit is reset, the flip-flops $43_1$ to $43_n$ each provide a "1" level output from the output terminal. This output is fed to the second input terminal of each of the AND gates $44_1$ to $44_n$. An enable signal input terminal is connected through an inverter to the third terminal of each of the AND gates $44_1$ to $44_n$. The output terminals of the AND gates $44_1$ to $44_n$ are connected to input terminals of drivers $45_1$ to $45_n$ which have the function of an inverter. The output terminals of the drivers $45_1$ to $45_n$ are connected through heating elements $32_1$ to $32_n$ to a voltage source $V_H$.

Figure 9:
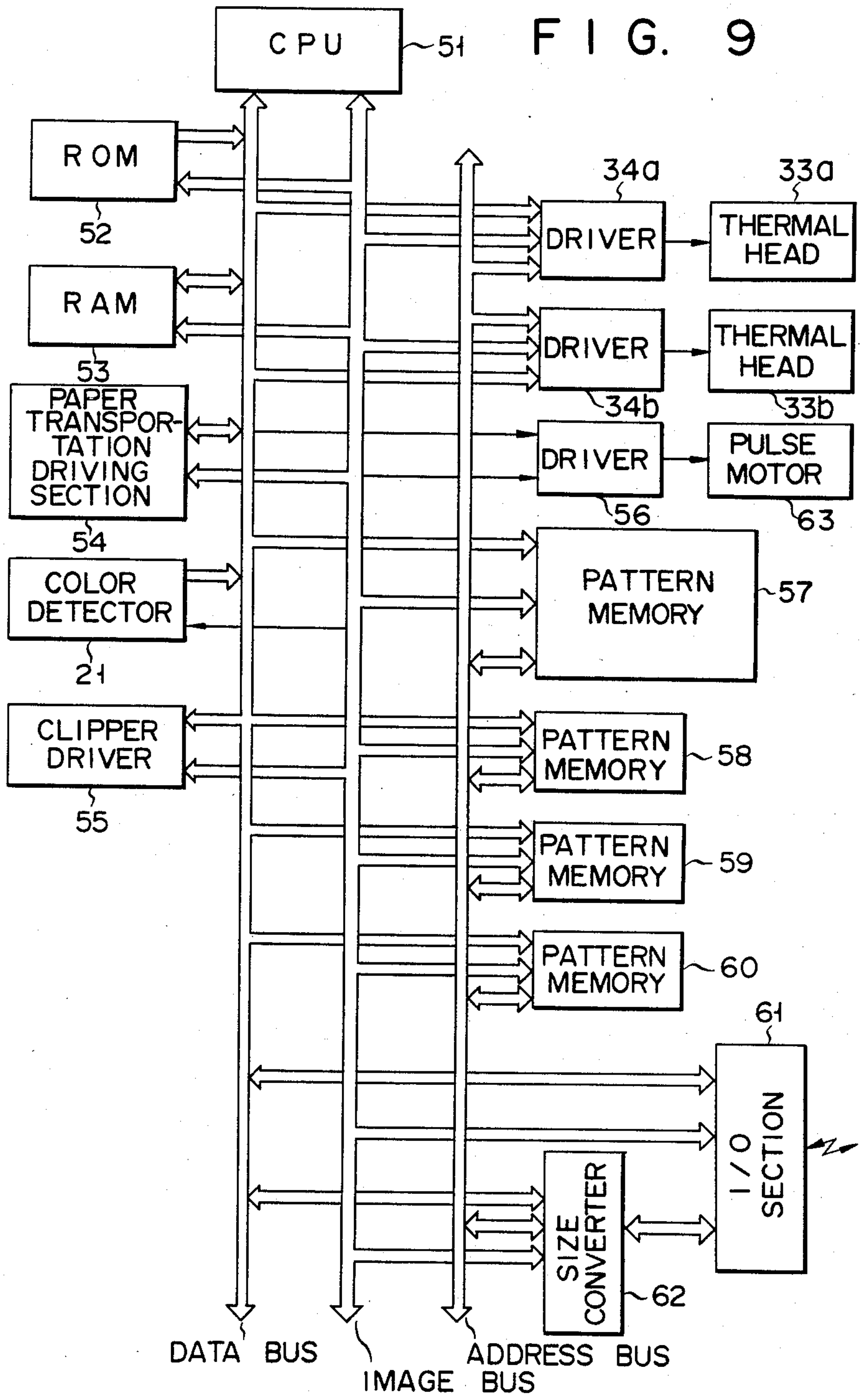
FIG. 9 is a block diagram showing the circuitry of the printing apparatus shown in FIG. 1.
Figure 10:
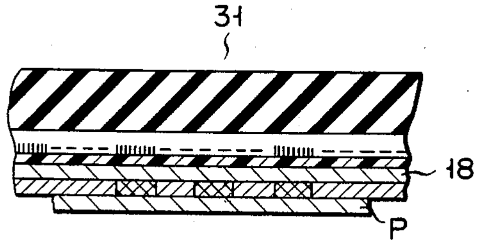
FIGS. 10 and 11 are views showing thermal transfer.

FIG. 9 shows the circuitry of the thermal transfer type printing apparatus.

A CPU 51 which controls the operation of the entire apparatus is connected to a ROM 52, in which a control program is stored, and a RAM 53, in which data is written, through a data bus and an image bus. A color detector 21, a transportation driving section 54 and a clipper drive section 55 are connected to the data bus. The transportation driving section 54 controls drivers for feeding paper sheet and feeding ink ribbons 18 and 26. The data bus is also connected to the drivers 34*a*, 34*b* 56 and to the pattern memories 57, 58, 59 and 60. The data bus is further connected to input/output sections 61 and 62. The drivers 34*a*, 34*b* and 56 are respectively connected to the thermal heads 33*a* and 33*b* and a pulse motor 63. The pulse motor 63 drives the ink ribbon take-up reels 20 and 28. The pattern memory 57 stores image signal data for a black pattern, and has a storage capacity of, for instance, 3,456×4,800 bits. The pattern memories 58, 59 and 60 store respective image signal data for color patterns of cyan, magenta and yellow, and they have a storage capacity of, for instance, 1,728×2,400 bits. The input/output section 61 receives signals from external apparatus, e.g., an image signal from a video camera or a scanner of an electrophotographic apparatus, and also supplies and receives various data. The paper size converter 62, which is connected to the input/output section 61, convertes a video signal supplied from the input/output section 61 and having 3,456×4,800 bits to a signal corresponding to black-and-white printing or color printing. More particularly, when a black-and-white video signal is supplied, the converter 62 directly provides the input video signal of 3,456×4,800 bits signal. On the other hand, when color video signals are supplied, the converter 62 provides a video signal having one half the 3,456×4,800 bits, i.e., 1,728×2,400 bits. The thermal head drivers 34*a* and 34*b*, pattern memories 57 and 60 and size converters 62 are connected to the image bus and also to an address bus.

Figure 11:
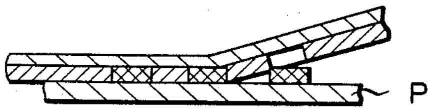

The operation of the printing apparatus having the above construction will now be described. When color image signals are supplied from an external apparatus, e.g., a scanner, to the input/output section 61, the input-/output section 61 first supplies a black image signal to the size converter 62. The size converter 62 directly couples the image signal of 3,456×4,800 bits for one scanning line after another to the image bus. The image signal supplied to the image bus is stored for one scanning line after another in the pattern memory 57. When the black image signal of 3,456×4,800 bits has been stored in the pattern memory 57, the input/output section 61 then supplies a color image signal for cyan to the size converter 62. The size converter 62 converts the input image signal of 3,456×4,800 bits into an image signal of 1,728×2,400 bits by removing every other bit. This image signal is transferred to one scanning line after the other to the pattern memory 58 through the image bus. When the cyan image signal data of 1,728×2,400 bits has all been stored in the pattern memory 58, a magenta image signal and then a yellow image signal are similarly transferred successively through the size converter 62 to the pattern memories 59 and 60 respectively to be stored in these memories. When the black, cyan, magenta and yellow image signal data have been stored in the respective pattern memories 57 to 60, the CPU 81 executes a printing program. First, it operates the transportation drive section 54 to drive motors for rotating the rollers 11 and 13. When the roller 11 is rotated, a paper sheet P is fed out from the paper cassette 10 to the rollers 13. The rollers 13 press the paper sheet P and make it flat and smooth. When the paper sheet P emerging from between the rollers 13 is transported to the color printing section 14, its leading edge is clipped by the clipper $16_1$ of the winding drum 15. This action of the clipper $16_1$ is caused when the clipper driver 55 is operated by the CPU 51. At this time, the CPU 51 drives a drum drive motor (not shown) to rotate the winding drum 15, whereby the paper sheet P is wound on the drum 15. Concurrently, the CPU 51 drives the pulse motor 63 through the driver 56, whereby the color ink ribbon take-up reel 20 is rotated to move the color ink ribbon 18. When a period from the detection of the leading edge of a cyan layer of the color ink ribbon 18 till the reaching of the printing section 14 by this detected edge has been elapsed, the CPU 51 stops the pulse motor 63 for stopping the ink ribbon 18. The CPU 51 then reads out the cyan image signal data from one scanning line after another from the pattern memory 58 and transfers it to the driver 34*a* through the image bus. The transferred image signal is supplied to the shift register 41 of the driver shown in FIG. 8. This image signal is shifted in the shift register 41 in synchronism to the clock signal. When an image signal of 1,728 bits corresponding to one line has been stored in the shift register 41, the CPU 51 supplies a latch signal to the latch circuit 42. The latch circuit 42 latches the image signal from the shift register 41 according to the latch signal. At this time, the AND gates $44_1$ to $44_{1,728}$ compare the preceding image signal in the latch circuit 43 and the present image signal in the latch circuit 42. Of the AND gates $44_1$ to $44_{1,728}$, those to which "1" level image signal components in the present image signal are fed are enabled. Thus, of the drivers $45_1$ to $45_{1,728}$ those corresponding to the enabled AND gates are rendered operative. For example, if the drivers $45_1$ to $45_{20}$ are rendered operative, these drivers $32_1$ to $32_{20}$ supply heating current to the corresponding heating elements $32_1$ to $32_{20}$ for a short period of time. At this time, the thermal head 33*a* is urging the cyan ink layer of the ink ribbon 18 against the paper sheet P as shown in FIG. 11, so that portions of the cyan ink layer corresponding to the energized heating elements $32_1$ to $32_{20}$ are separated from the condenser paper and transferred to the paper sheet P as shown in FIG. 11. Subsequently, the CPU 51 supplies a reset signal to the latch circuit 43 to reset the same. The latch circuit 43 opens the AND gates $44_1$ to $44_{20}$ according to the reset signal. As a result, data in the latch circuit 42 is supplied through the AND gates $44_1$ to $44_{1,728}$ to the drivers $45_1$ to $45_{1,728}$. Thus, the heating elements $32_1$ to $32_{1,728}$ are selectively heated according to the image signal, whereby corresponding portions of the cyan ink layer of the ink ribbon 18 are transferred to the paper sheet P. Thus, a dot print for one scanning line of the image signal is formed on the paper sheet P. The CPU 51 then supplies a latch signal to the latch circuit 43, causing the latch circuit 43 to latch the data from the latch circuit 42, i.e., the present image signal. Thus, every time the CPU 51 supplies a latch signal to the latch circuit 42, a dot print corresponding to the image signal is formed on the paper sheet with a print density of 8 elements/mm. At this time, the winding drum 15 and ink ribbon reel 20 are being driven to feed the paper sheet P and ink ribbon 18 respectively. Thus, the cyan image signal of $1,728 \times 2,400$ bits is printed as a dot pattern on the paper sheet. Subsequently, the magenta image signal is printed. In this case, the winding drum 15 is first rotated to the start point position at the time of the printing for cyan. The paper sheet P is also positioned for accurate coordination between the cyan and magenta prints. The magenta printing is done similar to the cyan printing according to the image signal from the pattern memory 59. When the magenta printing is completed, yellow printing is done according to the image signal in the pattern memory 60.

In the above printing operation, only the heating elements corresponding to the "1" level signal elements among the newly supplied signal elements are heated as mentioned earlier. This is done in order to prevent excessive temperature increase of heating elements that would result if the elements were energized after they had been energized for the preceding line.

When the color printing is completed in the above way in the color printing section 14, the clippers $16_1$ and $16_2$ are released, and the color printed paper sheet P on the winding drum 15 is separated from the drum 15 by the paper separating nail 22 and transported along the transport path 12. When the paper sheet P is transported to the black-and-white printing section 23, the CPU 51 reads out the black image signal for one scanning line (i.e., 3,456 bits) after another from the pattern memory 57 and transfers it to the thermal head driver 34*b* through the image bus. The thermal head driver 34*b* drives the thermal head 33*b* in the same manner as the driving of the thermal head 33*b* in the color printing section. Thus, a black dot pattern corresponding to the black image signal is transferred from the ink layer of the black ink ribbon 26 with a print density of 16 elements/mm onto the paper sheet in superimposition upon the color patterns. When the black image signal of $3,456 \times 4,800$ bits has been printed as black dot pattern on the paper sheet P, the paper sheet P is discharged to the tray 30 by the paper discharging rollers 29.

As has been shown, with the above embodiment the color image signals for cyan, magenta and yellow are successively printed as respective patterns of $1,728 \times 2,400$ dots on a paper sheet by the 1,728-bit thermal head unit, while the black image signal is printed as a pattern of $3,456 \times 4,800$ dots on the paper sheet by the 3,456-bit thermal head unit. That is, the color printing, which involves a plurality of printing cycles, is done in a reduced number of bits compared to black-and-white printing. Thus, the construction of and signal processing in the thermal head unit for the color printing can be simplified, and the printing speed can be increased. Further, for black-and-white printing only the black printing section need be operated, which is economical.

Figure 13:
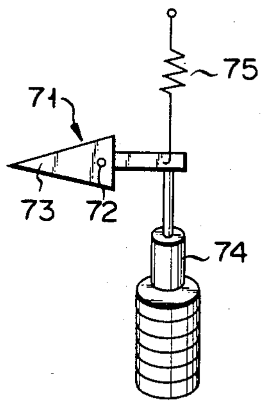
FIG. 13 is a perspective view showing a paper guide device used in the printing apparatus of FIG. 12.
Figure 12:
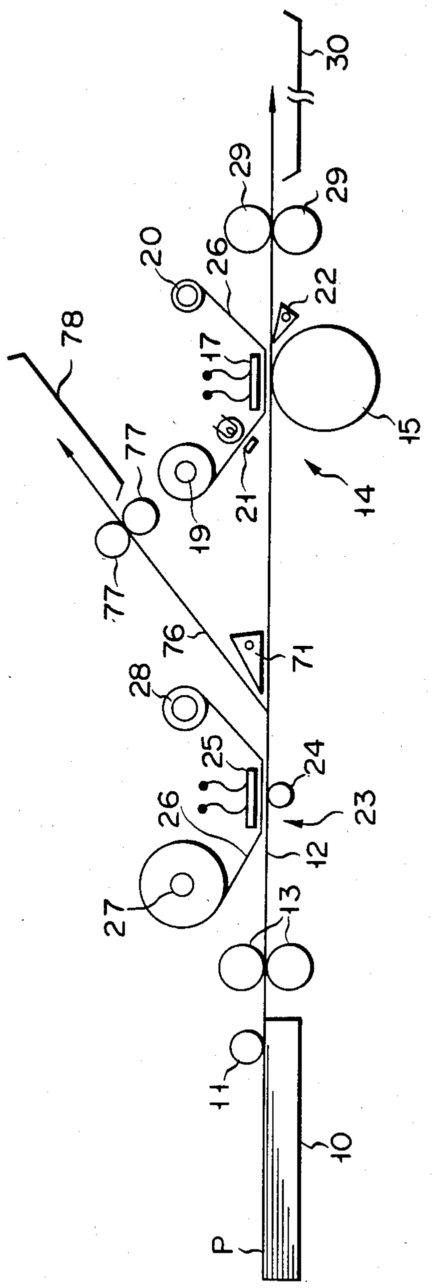
FIG. 12 is a schematic diagram showing a different embodiment of the thermal transfer type printing apparatus according to the invention.

FIG. 12 shows a different embodiment. In this embodiment, color printing section 14 is provided subsequent to black-and-white printing section 23 in the direction of transport of paper sheet. A paper sheet P is fed out by a feed roller 11 to press rollers 13. The paper sheet is made flat and smooth by the press rollers 13 to be transported along a path 12. When the paper sheet P is transported into the black-and-white printing section 23, a black signal is read out line after line from the pattern memory 57 shown in FIG. 9 to be supplied to the thermal head unit 25 for black-and-white printing. The thermal head unit 25 transfers ink of the black ink ribbon 26 in the form of dots to the paper sheet P according to the black image signal. Thus, a print of a black image pattern on the paper sheet is obtained according to the black image signal. The printed paper sheet P is transported from the black-and-white printing section 23 to the guide device 71. As shown in FIG. 13, the guide device 71 includes a guide member 73 which is pivotally mounted on a shaft 72. It can switch two paper sheet paths according to whether an electromagnetic plunger 74 is operated against a spring 75. The electromagnetic plunger 74 is operated according to whether black-and-white printing mode or color printing mode is set. When the black-and-white printing mode is set, the paper sheet P is guided by the guide device 71 to a path 76 to be discharged into a tray 78 by paper discharging rollers 77. When the color printing mode is set, the paper sheet is guided along the path 12 into the color printing section 14. In the color printing section 14, color printing is carried out on the black printed paper sheet according to image signals for cyan, magenta and yellow stored in the pattern memories 58, 59 and 60 as in the previous embodiment. The color printed paper sheet is separated from the winding drum 15 by the paper separating nail 22 to be discharged into the tray 30 by the rollers 29.

In the case of the monochromatic, i.e., black-and-white printing, only the black-and-white printing section need be operated so that the speed of black-and-white printing can be increased. Besides, since the black ink ribbon which is used more frequently than the color ink ribbon is provided for a greater number of prints than the color ink ribbon, the interval of maintenance can be increased.

In the above embodiments, color printing in the color printing section has been done in three colors. However, color printing may be done in other than three colors, for instance in one color, two colors or four or more colors. Further, the black-and-white printing section is not limited to black-and-white printing, but can perform monochromatic printing in a color other than black as well.

As has been described in the foregoing, according to the invention a black-and-white printing section and a color printing section are provided separately, so that the printing speed in the black-and-white printing mode can be increased while it is possible to save wasteful consumption of the ink ribbon. Further, since the bit number of the color thermal head unit is reduced compared to the bit number of the monochromatic thermal head unit, the construction of the color thermal head unit can be simplified, and also the signal processing in the signal processing section of the color thermal head unit in the color printing can be simplified.

What we claim is:

1. A thermal transfer type printing apparatus comprising:

means for transporting a paper sheet along a transport path;

a mono-color printing section disposed on said transport path and including a plurality of first heating elements selectively energized according to a first color image signal in a state urging a monochromatic ink ribbon having a one color ink layer against said paper sheet, the ink layer of said ink ribbon being thereby transferred onto said paper sheet according ro selective energization of said first heating elements; and a multi-color printing section disposed on said transport path after said mono-color printing section and including a plurality of second heating elements selectively energized according ro each of a plurality of second image signals for respective different colors in a state contacting a portion of multi-color ink ribbon having color ink layers of said different colors which are arranged in a predetermined order, on said paper sheet passed through said mono-color printing section, the color ink layers of said multi-color ink ribbon being successively transferred in a overlap state onto said paper sheet according to selective energization of said second heating elements.

2. The thermal type printing apparatus according to claim 1, wherein said transport path has a branch transport path directly after said mono-color printing section, and said mono-color printing section includes means for discharging said paper sheet printed by the monochromatic ink ribbon to said branch transport path.

3. The thermal transfer type printing apparatus according to claim 1, wherein the number of the second heating elements of said second printing section is less than the number of first heating elements of said first printing section.

4. The thermal transfer type printing apparatus according to claim 1, wherein said monochromatic ink ribbon is a black ink ribbon.

5. The thermal transfer type printing apparatus according to claim 1, wherein said multi-color ink ribbon has cyan, magenta and yellow ink layers arranged in the mentioned order.

* * * * *

UNITED STATES PATENT AND TRADEMARK OFFICE

CERTIFICATE OF CORRECTION

PATENT NO. : 4,542,387

DATED : September 17, 1985

INVENTOR(S) : Nagashima et al

It is certified that error appears in the above-identified patent and that said Letters Patent is hereby corrected as shown below:

The assignee should be shown as: Tokyo Shibaura Denki Kabushiki Kaisha.

Signed and Sealed this

*Eleventh* Day of *March 1986*

[SEAL]

*Attest:*

DONALD J. QUIGG

*Attesting Officer* *Commissioner of Patents and Trademarks*